United States Patent [19]

Selin et al.

[11] Patent Number: 4,526,620
[45] Date of Patent: Jul. 2, 1985

[54] CELLULOSE CARBAMATE SOLUTIONS

[75] Inventors: Johan Selin, Helsinki; Jouko Huttunen, Porvoo; Olli Turunen, Porvoo; Vidar Eklund, Porvoo; Kurt Ekman, Porvoo, all of Finland

[73] Assignee: Neste Oy, Finland

[21] Appl. No.: 556,332

[22] Filed: Nov. 30, 1983

[30] Foreign Application Priority Data

Dec. 8, 1982 [FI] Finland ............................... 824215

[51] Int. Cl.$^3$ .......................... C08L 1/00; C08B 15/06
[52] U.S. Cl. .................................. 106/203; 106/186; 536/30
[58] Field of Search .................. 536/30; 106/203, 186

[56] References Cited

U.S. PATENT DOCUMENTS

| | | | |
|---|---|---|---|
| 2,129,708 | 9/1938 | Schreiber | 106/203 |
| 3,447,939 | 6/1969 | Johnson | 106/203 |
| 4,278,790 | 7/1981 | McCormick | 106/203 |
| 4,404,369 | 9/1983 | Huttunen et al. | 536/30 |

FOREIGN PATENT DOCUMENTS 217166  9/1924  United Kingdom ............... 106/203

OTHER PUBLICATIONS

Chem. Abst: 67: 65,581t 1966.

*Primary Examiner*—Theodore Morris
*Attorney, Agent, or Firm*—Steinberg & Raskin

[57] ABSTRACT

The invention relates to cellulose carbamate solutions having improved capacity for fiber spinning or film formation therefrom. The addition of urea to the aqueous alkali in which the cellulose carbamate is dissolved results in an increase in the amount of cellulose carbamate that can be dissolved and a decrease in the viscosity and clogging number of the solution as compared to such solutions without urea.

15 Claims, No Drawings

CELLULOSE CARBAMATE SOLUTIONS

BACKGROUND OF THE INVENTION

Finnish Pat. No. 610033 discloses a process for the manufacture of an alkali-soluble cellulose compound without using carbon disulfide or any other environmentally harmful chemicals. In this method cellulose is heated with urea in an organic liquid in which urea is substantially insoluble.

U.S. Pat. No. 4,404,369 describes an improvement in this method according to which cellulose is treated with liquid ammonia having urea dissolved therein, the ammonia is removed, resulting in cellulose having urea distributed therethrough, and the cellulose-urea is heated to cause reaction between the urea and the cellulose to form the alkali-soluble cellulose carbamate which can be precipitated from alkali solution in the form of cellulose carbamate film or fiber.

The above procedures are based on the fact that when urea is heated to the melting point, or higher, it begins to decompose into isocyanic acid and ammonia. Isocyanic acid is not a particularly stable compound and tends to become trimerized into isocyanuric acid. The isocyanic acid also tends to react with urea to form biuret. Still further, the isocyanic acid reacts with cellulose to produce the alkali-soluble cellulose derivative cellulose carbamate.

The reaction may be written as follows:

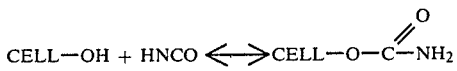

The thus produced cellulose compound, namely cellulose carbamate, may be dried after washing and stored even for prolonged periods of time, or it may be dissolved, for instance for fiber manufacture, in an aqueous alkali solution. Cellulose carbamate fibers or films may be manufactured from such solution by spinning or by extruding, in the same manner as in the viscose manufacturing process. The stability of cellulose carbamate and the feasibility of its transport in dry state afford a great advantage compared with cellulose xanthate in the viscose method since the latter cannot be stored or transported, neither in dry nor in solution form.

When it is desired to manufacture continuous fiber or filament suitable, for example, for textile use of the like, from the cellulose carbamate, the cellulose carbamate is first dissolved in an alkali, e.g. sodium hydroxide solution. Cellulose carbamate may be spun through orifices from the solution into an acid precipitation bath which causes precipitation of the cellulose carbamate. Film formation can likewise be accomplished by extruding the solution into an acid precipitation bath. The precipitation may also be accomplished by spinning or extruding into lower alcohols such as methanol, ethanol or butanol, or into hot aqueous salt solutions.

The spinability of the alkali solution of cellulose carbamate is influenced by several factors, including: carbamate content, viscosity and clogging number of the solution. The clogging number is the amount of gel-resembling, only partly dissolved, fiber particles contained in the solution. As the carbamate content of the solution is increased, the fiber spinning capacity is increased. However, the increase in carbamate content in the solution results in an increase in the viscosity of the solution, which in turn restricts the fiber spinning capacity. This even occurs when zinc salts are used as an agent for improving the solubility of the carbamate.

SUMMARY OF THE INVENTION

This invention relates to improved alkali solutions of cellulose carbamate which provide for increased solubility of the cellulose carbamate while maintaining the viscosity of the solution at a sufficiently low level to permit use of the higher concentration solutions for spinning the fibers and extrusion of films.

It is accordingly an object of the present invention to provide for improvements in solutions of cellulose carbamate in aqueous alkali.

It is accordingly a primary object of the present invention to provide for improvements in alkali solutions of cellulose carbamate.

It is another object of the present invention to provide alkali solutions of cellulose carbamate in which greater amounts of cellulose carbamate can be dissolved without adverse increase in the viscosity of the solution.

It is yet another object of the present invention to provide for methods of forming improved cellulose carbamate solutions in aqueous alkali.

Other objects and advantages of the present invention will be apparent from a further reading of the specification and of the appended claims.

With the above and other objects in view, the present invention mainly comprises solutions from which cellulose carbamate fibers or films can be formed, said solutions comprising cellulose carbamate dissolved in aqueous alkali solution which also contains urea.

The addition of urea to improve the solubility of cellulose carbamate in aqueous alkali provides the possibility of producing more concentrated carbamate solutions while maintaining the viscosity of the solutions at a sufficiently low level to permit fiber formation or film formation therefrom.

The addition of the urea to the aqueous alkali in which the cellulose carbamate is being dissolved provides still another advantage. The dissolution of urea in the alkali is an endothermic reaction which counteracts the increase of temperature resulting from the dissolution of the cellulose carbamate.

While the invention is applicable to any aqueous alkali solution in which cellulose carbamate can be dissolved, as a practical matter it is aqueous solution of sodium hydroxide which are used. While other alkalis such as potassium hydroxide and lithium hydroxide can be used for the dissolution of the cellulose carbamate and the ultimate spinning or film forming of the cellulose carbamate from the solution, these substances are much more expensive than sodium hydroxide and as a consequence it is generally sodium hydroxide which is used for the purposes of the invention.

The amount of alkali in the aqueous alkali solution in which the cellulose carbamate is dissolved in accordance with the present invention is an amount which is sufficient for the dissolution of cellulose carbamate. In practical operation for the spinning of cellulose carbamate fibers or the extrusion of cellulose carbamate film the amount of alkali in the solution is between about 6–11% by weight, preferably about 7.5–9.5%.

The dissolution of cellulose carbamate in aqueous alkali according to the present invention is improved, both with respect to increase in the quantity of cellulose carbamate that can be dissolved and in preventing undesirable increase in the viscosity of the solution by the addition of urea in an amount sufficient to improve the solubility of the cellulose carbamate. In general the amount of urea for this purpose is between about 1-10% by weight, and is most preferably between about 3-8% by weight.

The amount of cellulose carbamate dissolved in the aqueous alkali solution which also contains urea is such as to provide good spinnability of fiber or film formation. As a practical matter therefore the amount of cellulose carbamate in the solution should not exceed about 10% by weight and in practice the value is generally maintained between about 2-10% by weight.

The dissolution of the cellulose carbamate in accordance with the present invention is most advantageously accomplished in the following manner: the cellulose carbamate is first suspended in water and the alkali solution required for the dissolution of the cellulose carbamate is then added. The urea which is used for improving the solubility may be added separately to the mixture of the cellulose carbamate suspended in water with the alkali solution added thereto, but is preferably effected by adding the same to the alkali solution which is then added to the suspension of cellulose carbamate in water.

The actual dissolution of the cellulose carbamate is preferably effected in the cold added temperature of approximately $-5°$ C. with continuous mixing, and, if required, with additional cooling. The urea reduced the need for additional cooling because the dissolution of the urea in the aqueous alkali is endothermal in nature. Adequate dissolution of the cellulose carbamate generally requires about 1-3 hours. If a higher temperature is used in the dissolution, the rate of dissolution goes down appreciably. It is preferred in accordance with the present invention to effect the dissolution at a temperature between about $+3°$ C. and $-5°$ C.

DESCRIPTION OF THE PREFERRED EMBODIMENTS

The following examples are given to further illustrate the present invention. The scope of the invention is not, however, meant to be limited to the specific details of the examples.

EXAMPLE 1

For dissolving tests, cellulose carbamate was produced as follows:

The degree of polymerization (DP) of commercial soluble cellulose was adjusted to a level of 370 by irradiating it with a gamma irradiator, with a dosage of about 1.5 Mrad. The cellulose was dry-dispersed, and a 400 g batch thereof was impregnated with liquid ammonia at $-40°$ C. in which 400 g urea had been dissolved. Subsequent to impregnation, the excess solution was removed, and the mass dried. 67% urea, referred to the weight of cellulose, remained in the cellulose. The cellulose was then placed in a heating chamber for 4.5 hrs at 125°-130° C. The DP of the reaction product was 269 and the nitrogen content 1.9%.

In the cellulose carbamate dissolving test, 14 g cellulose carbamate produced as described above were taken and suspended in 74 g cold water. The suspension was cooled to $+3°$ C.

To the cooled suspension were added 112 g of a solution containing 18 g sodium hydroxide, 20 g urea and 74 g water. After addition, the suspension was placed on a cold bath, the temperature of which was $-5°$ C. After mixing for three hours, the ball viscosity and filtrability of the solution were measured. The filtrability was determined by measuring the so-called clogging number, which is found by the procedure present in: H. Sihtola, Paperi ja Puu 44 (1962), No. 5, p. 295-300. In the procedure, a miniature filter is used having an effective area of 3.8 cm$^2$, the filtering material being Macherey-Nagel Mn 616 paper. The filtrability is calculated from the formula:

$$K_{W20,60} = 5000 \left( \frac{60}{P_{60}} - \frac{20}{P_{20}} \right)$$

$P_{20}$ = solution quantity (in g) passing through the filter in 20 min.
$P_{60}$ = solution quantity (in g) passing through the filter in 60 min.
$K_{W20,60}$ = clogging number Table I sets forth the amounts of urea dissolved and the viscosity of the solution obtained, the quantity of solution passing through the filter in one hour, and the clogging number. Both the viscosity and clogging determinations were carried out at $-5°$ C.

TABLE I

| Urea quantity added, % | Viscosity, Pas | Passing solution quantity, g | Clogging number K |
|---|---|---|---|
| — | 8.3 | 51.3 | 2260 |
| 2 | 8.2 | 67.5 | 1485 |
| 3 | 9.6 | 81.4 | 1160 |
| 4 | 9.0 | 104.2 | 935 |
| 5 | 6.3 | 90.9 | 1150 |
| 7 | 8.3 | 73.7 | 1275 |
| 10 | 7.7 | 81.1 | 1145 |

EXAMPLE 2

Dissolving tests were carried out as in Example 1, using zinc oxide as dissolving-improving agent. The results are set forth in Table II.

TABLE II

| Urea quantity added, % | Zinc salt quantity added, % | Viscosity, Pas | Passing solution quantity, g | Clogging number K |
|---|---|---|---|---|
| — | 1 | 12.0 | 89.0 | 740 |
| 3 | 0.5 | 11.0 | 89.2 | 900 |
| 4 | 0.5 | 11.3 | 97.6 | 790 |
| 5 | 0.2 | 11.7 | 74.6 | 1375 |
| 5 | 0.5 | 12.5 | 90.9 | 875 |
| 5 | — | 8.2 | 80.4 | 1080 |

The above tests prove that addition of urea does not result in an increase of viscosity as in the case of zinc addition. When half of the zinc is replaced by urea (4%) the same or a better result is obtained as with zinc salt addition alone.

EXAMPLE 3

Preparation and dissolving of carbamate were carried out as in Example 1. The carbamate was dissolved using different urea and zinc salt additions. The results are stated in Table III.

TABLE III

| Cellulose carbamate | Urea, % | ZnO, % | Viscosity, Pas | Passing solution quantity, g | Clogging number K |
|---|---|---|---|---|---|
| 7.0 | — | 1.0 | 20.0 | 40.9 | 840 |
| 6.0 | — | 0.9 | 15.9 | 106.3 | 520 |

TABLE III-continued

| Cellulose carbamate | Urea, % | ZnO, % | Viscosity, Pas | Passing solution quantity, g | Clogging number K |
| --- | --- | --- | --- | --- | --- |
| 6.6 | 4 | — | 18.6 | 106.8 | 480 |

EXAMPLE 4

Cellulose carbamate was produced and dissolved as in Example 1. The cellulose carbamate content of the solution was 6.6% by weight. The results are stated in Table IV.

TABLE IV

| Urea, % | Viscosity, Pas | Passing solution quantity, g | Clogging number K |
| --- | --- | --- | --- |
| — | 8.9 | 101.9 | 650 |
| — | 9.8 | 139.5 | 490 |

While the invention has been illustrated with respect to particular solutions of cellulose carbamate, it is apparent that variations and modifications of the invention can be made.

What is claimed is:

1. Solution from which cellulose carbamate fiber or film can be formed, said solution comprising a predetermined amount of cellulose carbamate dissolved in a predetermined amount of aqueous alkali solution containing urea, said solution having a viscosity which is lower than the viscosity of a solution of the same predetermined amount of cellulose carbamate in the same predetermined amount of aqueous alkali solution without said urea.

2. Solution according to claim 1 wherein the amount of urea is between about 1–10% by weight.

3. Solution according to claim 2 wherein the amount of cellulose carbamate is between about 2–10% by weight.

4. Solution according to claim 1 wherein said alkali is sodium hydroxide.

5. Solution according to claim 3 wherein said alkali is sodium hydroxide.

6. Solution according to claim 1 wherein the amount of alkali is between about 6–11% by weight.

7. Solution according to claim 3 wherein the amount of alkali is about 6–11% by weight.

8. Method of dissolving cellulose carbamate for the formation of a solution from which cellulose carbamate fiber or film can be formed, said method comprising dissolving a predetermined amount of cellulose carbamate in a predetermined amount of aqueous alkali solution containing urea, the resulting solution having a viscosity which is lower than the viscosity of a solution of the same predetermined amount of cellulose carbamate in the same predetermined amount of aqueous alkali solution without said urea.

9. Method according to claim 8 wherein the amount of urea is between about 1–10% by weight.

10. Method according to claim 8 wherein said dissolution is effected at a temperature of between about +3° C. and −5° C.

11. Method according to claim 9 wherein said dissolution is effected at a temperature of between about +3° C. and −5° C.

12. Method of dissolving cellulose carbamate for the formation of a solution from which cellulose carbamate fiber or film can be formed, said method comprising adding a predetermined amount of an alkali solution containing urea to a predetermined amount of an aqueous suspension of cellulose carbamate, the resulting solution having a viscosity which is lower than the viscosity of a solution of the same predetermined amount of cellulose carbamate in the same predetermined amount of aqueous alkali solution without said urea, whereby cellulose carbamate fiber or film can be formed effectively from the lower viscosity solution.

13. Method according to claim 12 wherein the amount of urea is between about 1–10% by weight.

14. Method according to claim 12 wherein the addition of the aqueous alkali solution to the aqueous suspension is effected at a temperature of between about +3° C. and −5° C.

15. Method according to claim 13 wherein the addition of the alkali solution to the aqueous suspension of cellulose carbamate is effected at a temperature of between about +3° C. and −5° C.

* * * * *